(12) United States Patent
Han et al.

(10) Patent No.: US 12,716,457 B2
(45) Date of Patent: Aug. 25, 2026

(54) DISCONNECT MODULE, POWER TRANSMISSION SYSTEM FOR A VEHICLE, SYNCHRONIZATION MECHANISM FOR A VEHICLE AND VEHICLE

(71) Applicant: VALEO EMBRAYAGES, Amiens Cedex (FR)

(72) Inventors: Yefei Han, Amiens Cedex (FR); Fei He, Amiens Cedex (FR); Xun Hu, Amiens Cedex (FR)

(73) Assignee: VALEO EMBRAYAGES, Amiens Cedex (FR)

(*) Notice: Subject to any disclaimer, the term of this patent is extended or adjusted under 35 U.S.C. 154(b) by 0 days.

(21) Appl. No.: 18/818,713

(22) Filed: Aug. 29, 2024

(65) Prior Publication Data

US 2025/0075748 A1 Mar. 6, 2025

(30) Foreign Application Priority Data

Sep. 1, 2023 (CN) ......................... 202311137767.4

(51) Int. Cl.
*F16D 11/10* (2006.01)
*F16D 23/02* (2006.01)
(Continued)

(52) U.S. Cl.
CPC .............. *F16D 11/10* (2013.01); *F16D 23/02* (2013.01); *F16H 48/142* (2013.01); *F16D 2011/002* (2013.01); *F16H 2063/3056* (2013.01)

(58) Field of Classification Search
CPC ........... F16H 48/142; F16H 2063/3056; F16H 2035/006; F16H 1/2818; F16H 1/2827;
(Continued)

(56) References Cited

U.S. PATENT DOCUMENTS 10,337,572 B2 * 7/2019 Severinsson ............ F16D 23/14
10,610,429 B2 * 4/2020 Heneveld, Jr. ......... A61G 7/015
(Continued)

FOREIGN PATENT DOCUMENTS

CN 208 057 750 U 11/2018
CN 112178067 B * 12/2021 ............. F16H 61/14
(Continued)

OTHER PUBLICATIONS

Extended European Search Report issued Feb. 12, 2025, in European Patent Application No. 24197446.8, citing documents 1, 2, and 15-17, therein, 8 pages.

*Primary Examiner* — Bobby Rushing, Jr.
(74) *Attorney, Agent, or Firm* — Oblon, McClelland, Maier & Neustadt, L.L.P.

(57) ABSTRACT

A disconnect module for engaging/disengaging a first shaft with a first component includes a connecting shaft arranged coaxially with the first shaft, one end of which is rotatably supported on the first shaft, and the other end connected to the first component, and a sliding sleeve on outer sides of the first shaft and the connecting shaft. The sliding sleeve is rotatably connected to the first shaft and can reciprocate axially by an axial distance to engage/disengage from the connecting shaft and includes a circumferential groove open to the outside. The module also includes a motor, a speed reducer connected to the motor and including an output shaft, and a drive block connected to the output shaft and extending into the circumferential groove and driven by the speed reducer to rotate, thereby driving the sliding sleeve to reciprocate axially. A mechanical position-limiting mechanism is provided on the output shaft.

12 Claims, 5 Drawing Sheets

(51) Int. Cl.

| | |
|---|---|
| ***F16H 48/14*** | (2006.01) |
| ***F16H 63/30*** | (2006.01) |
| *F16D 11/00* | (2006.01) |

(58) Field of Classification Search

CPC ...... F16H 1/2836; F16H 1/2845; F16D 11/10; F16D 11/14; F16D 28/00; F16D 2023/123; F16D 2125/26; F16D 2011/002

See application file for complete search history.

(56) References Cited

U.S. PATENT DOCUMENTS

| | | | | |
|---|---|---|---|---|
| 11,525,485 | B1 * | 12/2022 | Lee | F16D 28/00 |
| 12,066,062 | B2 * | 8/2024 | Nilsson | H02P 29/0027 |
| 2002/0093265 | A1 * | 7/2002 | Nelson | H02K 7/12 310/192 |
| 2013/0256083 | A1 * | 10/2013 | Fujii | F16D 28/00 192/70.23 |
| 2016/0131253 | A1 | 5/2016 | Pritchard et al. | |
| 2018/0345785 | A1 * | 12/2018 | Beesley | F16D 11/04 |
| 2020/0223309 | A1 | 7/2020 | Beesley | |
| 2024/0353003 | A1 | 10/2024 | Mollier et al. | |

FOREIGN PATENT DOCUMENTS

| | | | | | |
|---|---|---|---|---|---|
| CN | 217081280 | U | | 7/2022 | |
| CN | 217097847 | U | | 8/2022 | |
| CN | 115076366 | A | | 9/2022 | |
| CN | 115978189 | A | * | 4/2023 | F16D 23/06 |
| DE | 10 2014 224366 | A1 | | 6/2016 | |
| DE | 112019003566 | B4 | * | 6/2022 | B60N 2/165 |
| DE | 102021207495 | A1 | * | 1/2023 | F16H 63/3016 |
| DE | 10 2021 209053 | A1 | | 2/2023 | |

* cited by examiner

DISCONNECT MODULE, POWER TRANSMISSION SYSTEM FOR A VEHICLE, SYNCHRONIZATION MECHANISM FOR A VEHICLE AND VEHICLE

FIELD OF THE INVENTION

The present disclosure relates to a disconnect module for engaging or disengaging a first component with or from a first shaft. The present disclosure also relates to a power transmission system for a vehicle and a synchronization mechanism for a vehicle, which include the disconnection unit. In addition, the present disclosure also relates to a vehicle, which includes the power transmission system.

BACKGROUND OF THE INVENTION

The trend of designing and manufacturing fuel-efficient and low-emission vehicles has greatly increased, which is inevitably caused by environmental concerns and increased fuel costs. The forefront of this trend is the development of electric vehicles, such as pure electric vehicles, hybrid vehicles, plug-in hybrid vehicles, extended-range electric vehicles, fuel cell vehicles, etc.

Four-wheel drive electric vehicles are equipped with motors at the front and rear, which are usually divided into main drive motors and auxiliary drive motors, wherein, in some cases, the auxiliary drive motors may be in a non-working state. For example, the auxiliary drive motors are used only during acceleration or special working conditions, or when a driver needs to obtain some high-performance modes. However, when an auxiliary drive motor stops running, the wheel will still drive the auxiliary drive differential to operate, and the differential will drive all transmission mechanisms and motors connected thereto to rotate together, thereby generating drag loss. To improve efficiency, a disconnection mechanism is added to the power transmission system of the electric vehicle, thereby reducing drag loss.

A motor actuator of the disconnection mechanism is usually connected to a speed reducer mechanism for increasing a torque. The speed reducer mechanism of the prior art includes a planetary gear speed reducer with an eccentric drive block, a fork ball screw, a worm gear speed reducer and so on. These speed reducer mechanisms have their own advantages and disadvantages. The planetary gear speed reducer usually has high efficiency and strong robustness, but is expensive and has a small transmission ratio and a large footprint. The radial packaging size of the fork ball screw is limited by output shaft disconnection applications, and in addition, the fork stiffness affects the dynamic performance of engagement/disengagement. The worm gear speed reducer has low efficiency at high transmission ratios, and has a long response time.

SUMMARY OF THE INVENTION

The technical problem to be solved by the present disclosure is to overcome the defects or shortcomings of the prior art, and the present disclosure provides a disconnect module with a small overall footprint, a low cost, high position accuracy and a short response time.

The present disclosure provides a disconnect module for engaging/disengaging a first shaft with/from a first component, wherein the disconnect module comprises:

- a connecting shaft arranged coaxially with the first shaft, one end of which is rotatably supported on the first shaft, and the other end of which is fixedly connected to the first component;
- a sliding sleeve separately sleeved on outer sides of the first shaft and the connecting shaft, wherein the sliding sleeve is rotatably and fixedly connected to the first shaft and can reciprocate axially by an axial distance to engage with or disengage from the connecting shaft, the first shaft rotates together with the first component in an engaged state, the first shaft is independent of the first component in a disengaged state, and the sliding sleeve is provided with a circumferential groove open to the outside;
- a motor for outputting a torque;
- a speed reducer connected to the motor and comprising an output shaft; and
- a drive block fixedly connected to the output shaft and extending into the circumferential groove of the sliding sleeve to be driven by the speed reducer to rotate, thereby driving the sliding sleeve to reciprocate axially, a mechanical position-limiting mechanism is provided on the output shaft, so that the output shaft can only rotate by a set angle corresponding to the axial distance.

The present disclosure adopts the cycloidal gear speed reducer integrated with the mechanical position-limiting mechanism to achieve the improvement of motor torque and position feedback. It has high integration, a low cost, and a fast response speed. In addition, the speed reducing ratio of the cycloidal gear speed reducer is much higher than that of the planetary gear speed reducer in the prior art under the same volume. Therefore, the use of a smaller motor can meet the design requirements, thereby advantageously saving the occupied space and being more friendly to the vehicle layout. In addition, the rotation angle accuracy of the cycloidal gear speed reducer is also higher, which is more helpful for the actuator to achieve precise control of switching between the engaged and disengaged states.

Existing disconnection units usually use planetary gear speed reducers because they usually pay more attention to improving the efficiency of the transmission system. Planetary gears have high efficiency, high load, and strong robustness, but they have high requirements for motors, and the motor volume required to achieve the same output torque is relatively large. The inventors realize that the application scenario of the disconnect module of the present disclosure has a low load. Under light load conditions, the speed reducer does not need to have great robustness or large efficiency. The key is that it needs to have high position accuracy and a short response time. The use of the cycloidal gear speed reducer is of great help in cost, response time and accuracy.

It is noted that "rotatably fixed" described herein means that two components can be connected to rotate together, and their mutual movement in a rotation direction (such as a circumferential direction) is restricted so that they can rotate together. "Rotatably fixed" does not restrict the displacement in a rotation axis direction, so the two rotatably fixed components may have relative displacement in the rotation axis direction. If the displacement in the rotation axis direction is also fixed, it can be considered that the two components are completely fixedly connected.

It should also be noted here that the first shaft being independent of the first component in the disengaged state means that the motion state of the first shaft is independent of the motion state of the first component at this time. That is, the first shaft and the first component can rotate independently of each other, but it does not mean that there is no connection between them.

In an exemplary embodiment, the speed reducer comprises a corresponding mechanism that cooperates with the mechanical position-limiting mechanism, one of the mechanical position-limiting mechanism and the corresponding mechanism is a protrusion, and the other is a recess allowing the protrusion to slide therein.

In an exemplary embodiment, the speed reducer is a cycloidal gear speed reducer. The cycloidal gear speed reducer comprises: a housing; a cycloidal gear as an input shaft, wherein a plurality of transmission pins are provided on an end surface of the cycloidal gear; and a support plate for supporting the plurality of transmission pins, wherein the output shaft comprises a gear ring arranged around the cycloidal gear.

In an exemplary embodiment, the mechanical position-limiting mechanism is provided on a side of the gear ring facing the support plate, and the corresponding mechanism is provided on the support plate.

In an exemplary embodiment, the mechanical position-limiting mechanism is provided on a side of the gear ring facing the housing, and the corresponding mechanism is provided on the housing of the speed reducer.

In an exemplary embodiment, the motor and the speed reducer are coupled so that when the mechanical position-limiting mechanism acts, the motor maintains a first rotation direction to maintain one of the engaged state or the disengaged state, and when the motor needs to be switched to the other state, the motor rotates reversely relative to the first rotation direction.

In an exemplary embodiment, the sliding sleeve is connected to the connecting shaft through a segmented spline, and the segmented spline is a plurality of pairs of splines axially spaced apart from each other, and the plurality of pairs of splines comprise a first pair of splines that meet earlier than other pairs of splines in an engagement process.

In an exemplary embodiment, the first pair of splines are provided with end face chamfers that can abut against each other when meeting, respectively.

In an exemplary embodiment, the cycloidal gear speed reducer has a speed reducing ratio set to 10-30.

On the other hand, the present disclosure further provides a power transmission system for a vehicle, comprising: a drive motor having a drive shaft; a reduction gearbox having at least one transmission shaft; and the disconnect module described previously, wherein the first shaft is the drive shaft or the at least one transmission shaft.

On the other hand, the present disclosure further provides a synchronization mechanism for a vehicle, comprising: a differential having a differential output shaft; and the disconnect module described previously, wherein the first shaft is the differential output shaft, and the first component is a wheel.

On the other hand, the present disclosure further provides a vehicle, comprising the power transmission system described previously and/or the synchronization mechanism described previously.

These and other features, aspects and advantages of the present application will become better understood with reference to the following description. The accompanying drawings incorporated in this specification and constituting a part thereof illustrate embodiments of the present application, and are used to explain the principles of the present application together with the described description.

BRIEF DESCRIPTION OF THE DRAWINGS

The accompanying drawings are incorporated into and constitute a part of the specification. The accompanying drawings, together with the general description above, a detailed description of exemplary embodiments and methods given below, are used to explain the principles of the present disclosure. The objects and advantages of the present disclosure will become apparent when studying the following description according to the accompanying drawings, in which the same elements are given the same or similar reference signs, and in which.

IN THE FIGURES

Figure 1:
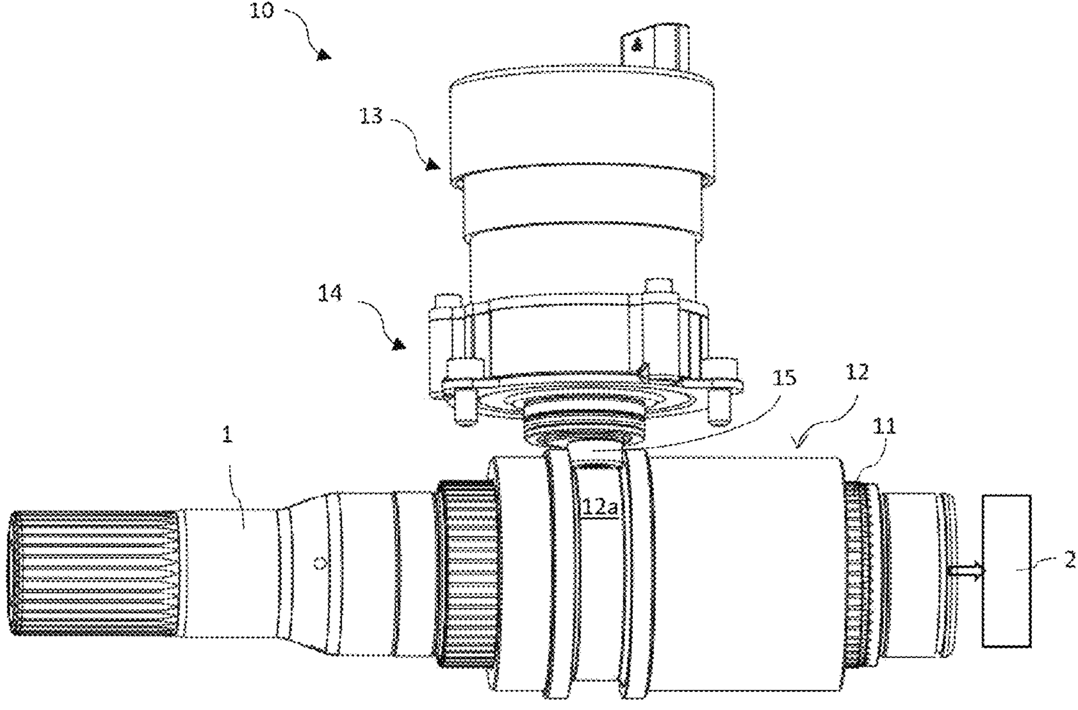
FIG. 1 shows a partial perspective view of an exemplary embodiment of a disconnect module of the present disclosure.

First shaft 1
First component 2
Disconnect module 10
Connecting shaft 11
Sliding sleeve 12
Circumferential groove **12*a***
First pair of splines **11*a*, 12*a***
End face chamfers **11*a*', 12*a*'**
Motor 13
Speed reducer 14
Drive block 15
Outer shell 16
Output shaft 141
Ring gear **141*a***
Cycloidal gear 142
Transmission pin **142*a***
Support plate 143
Support hole **143*a***
Housing 144
Protrusion A
Recess B

DETAILED DESCRIPTION OF THE INVENTION

Reference will now be made in detail to exemplary embodiments and methods of the present disclosure shown in the accompanying drawings, in which the same reference signs designate the same or corresponding components. However, it should be noted that the present disclosure in its broader aspects is not limited to specific details, representative devices and methods, and illustrative examples shown and described in connection with the exemplary embodiments and methods.

Unless otherwise defined, the technical or scientific terms used herein shall have the common meanings understood by those of ordinary skill in the field to which the present disclosure pertains. The words "first", "second", and the like used in the description and claims of the patent application disclosed herein do not indicate any order, quantity or importance, being merely used to distinguish different component parts. When the number of components is not specified, the number of components may be one or multiple. Similarly, the words such as "one", "the", "said" and the like do not necessarily indicate a quantity limitation. The word "comprise", "include" or the like mean that an element or object appearing before the word encompasses elements or objects listed after the word and their equivalents, without excluding other elements or objects. "Upper", "lower", "left", "right", etc. are only intended to indicate the relative orientation relationship when a device is used or the orientation relationship shown in the accompanying drawings. When the absolute position of the described object changes, the relative positional relationship may also change accordingly. Unless otherwise explicitly described, the terms "connecting", "connected" and the like refer to a relationship in which the structures are fixed or attached to each other directly or indirectly through intermediate structures.

Now refer to the accompanying drawings, in which the same numerals in all of the accompanying drawings represent the same elements.

Figure 2A:
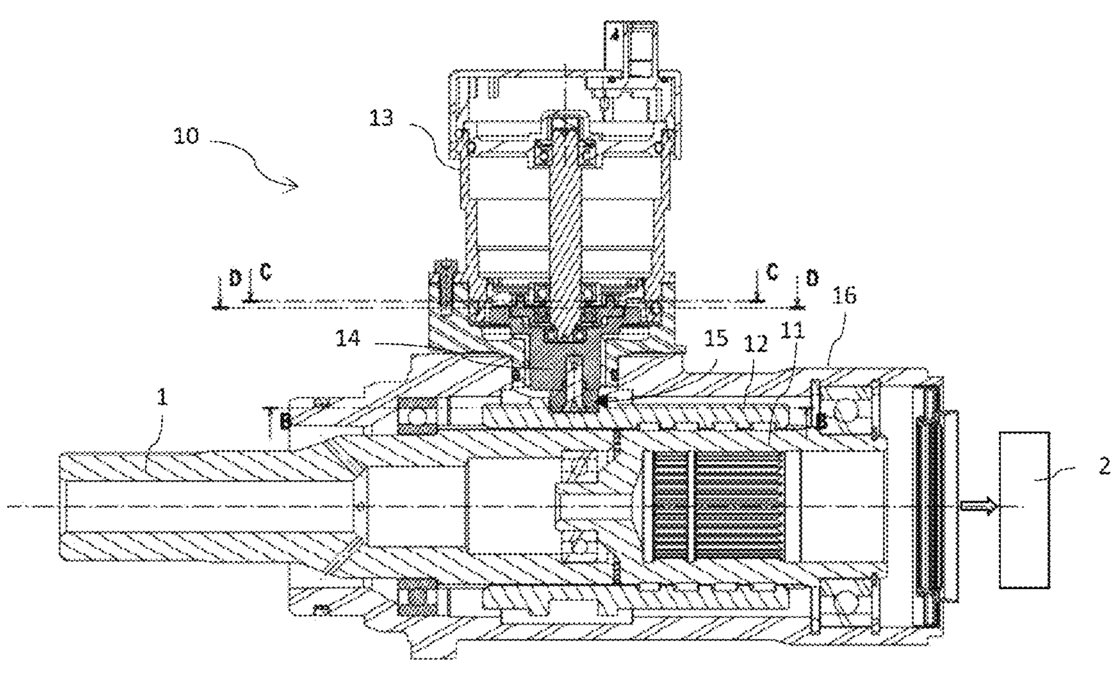
FIG. 2A shows a cross-sectional view of the disconnect module of the present disclosure in an engaged state.
Figure 2B:
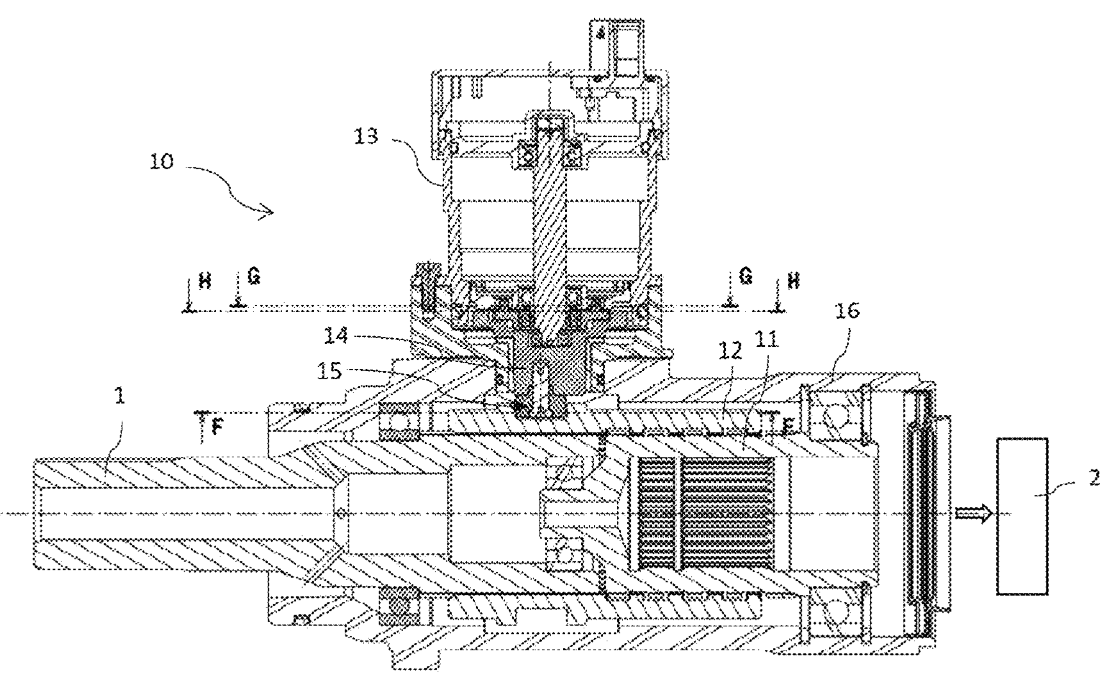
FIG. 2B shows a cross-sectional view of the disconnect module of the present disclosure in a disengaged state.

FIG. 1 shows a partial perspective view of an exemplary embodiment of a disconnect module 10 of the present disclosure. FIGS. 2A and 2B show cross-sectional views of the disconnect module 10 of the present disclosure in an engaged state and a disengaged state, respectively.

As shown in FIG. 1, the disconnect module 10 is used to engage/disengage a first shaft 1 with/from a first component 2, wherein the disconnect module 10 includes a connecting shaft 11, a sliding sleeve 12, a motor 13, a speed reducer 14 and a drive block 15.

The connecting shaft 11 is coaxially arranged with the first shaft 1, one end of the connecting shaft 11 is rotatably supported on the first shaft 1, and the other end is fixedly connected to the first component 2.

The sliding sleeve 12 is separately sleeved on the outer sides of the first shaft 1 and the connecting shaft 11. The sliding sleeve 12 is rotationally and fixedly connected to the first shaft 1 and can reciprocate axially by an axial distance to engage with or disengage from the connecting shaft 11. The sliding sleeve 12 is provided with a circumferential groove 12*a* open to the outside.

As shown in FIGS. 2A and 2B, the sliding sleeve 12, the first shaft 1 and the connecting shaft 11 are concentrically mounted in an outer shell 16 by means of a ball bearing and a retaining ring. To clearly show the connection relationship of the components of the disconnect module 10 in FIG. 1, the outer shell 16 is omitted.

The sliding sleeve 12 is processed with a multi-stage internal spline or a segmented internal spline. The first shaft 1 is processed to be connected to the sliding sleeve 12 with an external spline at one end and connected to an interface of a drive device (such as a differential) capable of outputting a torque with an external spline at the other end. The connecting shaft 11 is processed with a multi-stage external spline or a segmented external spline to be connected to the sliding sleeve 12, and is further processed with an internal spline to be connected to an interface of the first component (such as a wheel).

The motor 13 is used to output a torque. The speed reducer 14 is connected to the motor, and includes an output shaft 141 (shown in FIGS. 3A and 3B). The motor 13 and the speed reducer 14 form an actuator that can drive the drive block 15 to rotate.

The drive block 15 is fixedly connected to the output shaft 141 and extends into the circumferential groove 12*a* of the sliding sleeve 12, so as to be driven by the speed reducer 14 to rotate, thereby driving the sliding sleeve 12 to reciprocate axially. The drive block 15 is configured as a cylinder here and is eccentrically arranged relative to the rotation axis of the output shaft 141, but other conventional styles may also be adopted, which is not limited here.

When the drive block 15 rotates to the position of FIG. 2A, the sliding sleeve 12 moves rightward to the right end point of the axial distance and is engaged with the connecting shaft 11 through a multi-stage spline. In the engaged state, the torque of the first shaft 1 is transmitted to the first component 2.

When the drive block 15 rotates to the position of FIG. 2B, the sliding sleeve 12 moves leftward to the left end point of the axial distance, the multi-stage spline is disconnected at this time, and the sliding sleeve 12 is disengaged from the connecting shaft 11. In the disengaged state, the torque transmission from the first shaft 1 to the first component 2 is cut off, and the rotation of the first component 2 drives as few transmission components as possible, thereby reducing drag loss.

Figure 3A:
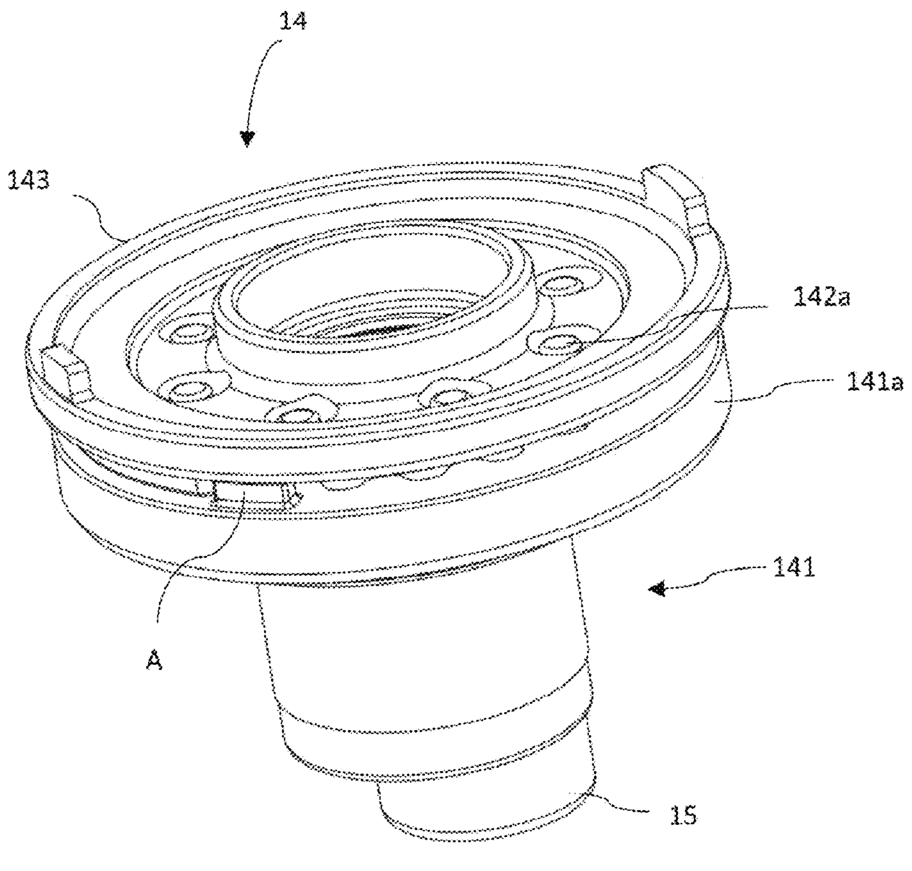
FIG. 3A shows a partial perspective view of a speed reducer in FIG. 1.

FIG. 3A shows a partial perspective view of the speed reducer 14 in FIG. 1.

As can be seen from the figure, the speed reducer 14 is a cycloidal gear speed reducer. The speed reducer 14 includes: a housing 144 (shown in FIG. 4C-4D); a cycloidal gear 142 as an input shaft, wherein a plurality of transmission pins 142*a* are provided on the end face of the cycloidal gear; a support plate 143 for supporting the plurality of transmission pins 142*a*; and an output shaft 141, wherein the output shaft 141 includes a gear ring 141*a* arranged around the cycloidal gear. To clearly show various components of the speed reducer 14, the housing 144 of the speed reducer 14 is omitted in FIG. 3A.

The output shaft 141 of the cycloidal gear speed reducer is provided with a mechanical position-limiting mechanism, which is a protrusion A in FIG. 3A, so that the output shaft 141 can only rotate by a set angle corresponding to the axial distance of the sliding sleeve 12.

The exemplary embodiment adopts the cycloidal gear speed reducer integrated with the mechanical position-limiting mechanism to achieve the improvement of motor torque and position feedback. It has high integration, a low cost, and a fast response speed. In addition, the speed reducing ratio of the cycloidal gear speed reducer is much higher than that of the planetary gear speed reducer in the prior art under the same volume. Therefore, the use of a smaller motor can meet the design requirements, thereby advantageously saving the occupied space and being more friendly to the vehicle layout. In addition, the rotation angle accuracy of the cycloidal gear speed reducer is also higher, which is more helpful for the actuator to achieve precise control of switching between the engaged and disengaged states.

Figure 3B:
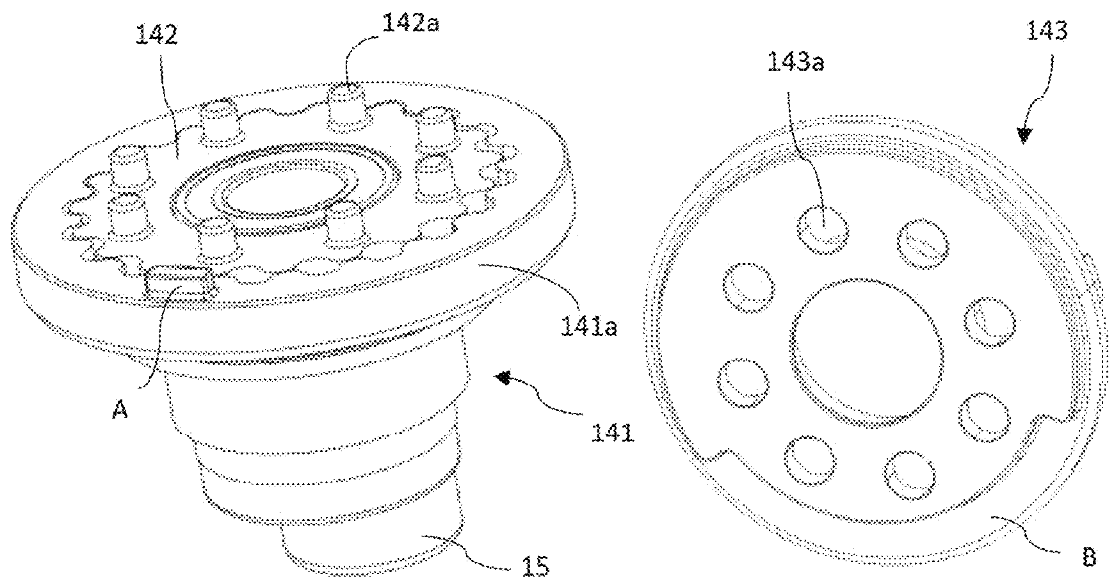
FIG. 3B shows an exploded view of an assembly in FIG. 3A.

In this exemplary embodiment, the speed reducer 14 further includes a corresponding mechanism that cooperates with the mechanical position-limiting mechanism, namely, a recess B shown in FIG. 3B, which allows the protrusion A to slide therein.

In another exemplary embodiment, the mechanical position-limiting mechanism and the corresponding mechanism may also be in the opposite form, that is, the mechanical limiting mechanism may be provided as a recess B, and the corresponding mechanism may be provided as a protrusion A.

In this exemplary embodiment, referring to FIGS. 3A and 3B, the mechanical position-limiting mechanism of the output shaft 141 is provided on the side of the ring gear 141*a* facing the support plate 143. The corresponding mechanism is provided on the support plate 143.

By providing the corresponding mechanism on the support plate 143, the mechanical position-limiting effect is better in that the support plate 143 and the output shaft 141 are made of the same or similar material, and are thus more wear-resistant than two matching components made of different materials. In addition, the components are more integrated and the structure is more compact.

In another exemplary embodiment, the mechanical position-limiting mechanism of the output shaft 141 may also be provided on the side of the ring gear 141*a* facing the housing 144, and the corresponding mechanism may be provided on the housing 144 of the speed reducer 14.

In another exemplary embodiment, the corresponding mechanism may also be provided not on the speed reducer 14, but on other devices adjacent to the output shaft 141.

FIG. 3B shows an exploded view of an assembly in FIG. 3A. Compared with FIG. 3A, the support plate 143 is removed in the left figure of FIG. 3B, and the support plate 143 is shown separately in the right figure of FIG. 3B.

Within the scope of the present disclosure, the speed reducing ratio of the cycloidal gear speed reducer may be set to 10-30. It should be noted that the speed reducing ratio is small, the response time is short, but the output torque is low, and the axial driving force that the drive block can provide is small. The speed reducing ratio is large, the response time is long, but the output torque is large, and the axial driving force that the drive block can provide is large. Within the speed reducing ratio range, a response time and an output torque that meet the requirements are provided.

In this exemplary embodiment, the speed reducing ratio of the cycloidal gear speed reducer is set to 20, thereby more advantageously providing a shorter response time and a larger output torque. As can be seen from the figure, the cycloidal gear 142 is provided with 19 external teeth here, and the ring gear 141*a* is provided with 20 internal teeth. A speed reducing ratio of 20 is thus formed. In the same volume, the speed reducing ratio of the planetary gear speed reducer is about 10.

The cycloidal gear 142 is provided with 8 transmission pins 142*a*, which transmission pins 142*a* are integrally constructed with the cycloidal gear 142. The cycloidal gear 142 is eccentric, so the 8 transmission pins 142*a* rotate eccentrically. The support plate 143 is provided with 8 support holes 143*a*. The support holes 143*a* are illustratively designed as through holes here, but may also be designed as blind holes. The diameters of the 8 support holes 143*a* are matched with the diameters of the 8 transmission pins 142*a* of the cycloidal gear 142, respectively, to accommodate the eccentric rotation of each transmission pin 142*a* therein. The diameter of the support hole 143*a* is generally slightly larger than the outer envelope circle formed by the rotation of the corresponding transmission pin 142*a*, for example, 0.15 to 0.2 mm larger than the diameter of the outer envelope circle.

Figures 4A, 5A:
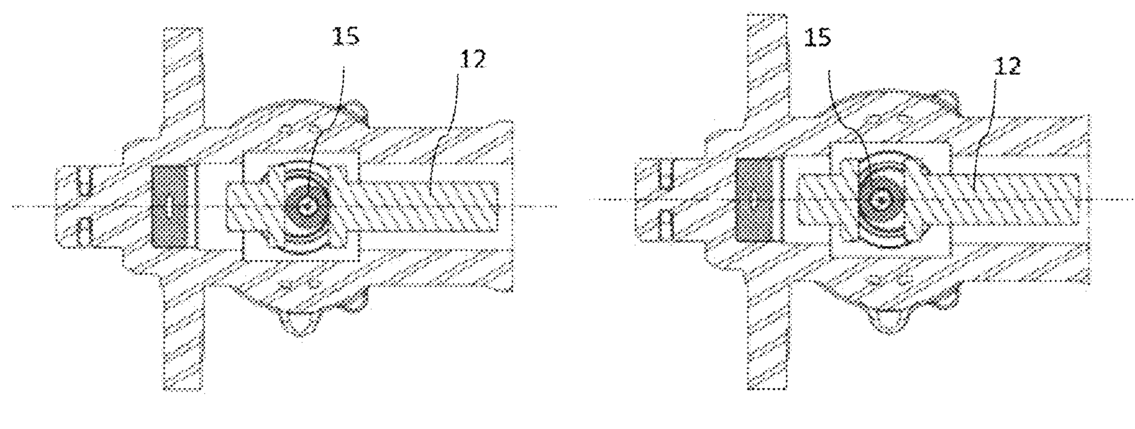
FIG. 4A shows a cross-sectional view obtained by cutting along line B-B of FIG. 2A.
FIG. 5A shows a cross-sectional view obtained by cutting along line F-F of FIG. 2B.
Figures 4B, 5B:
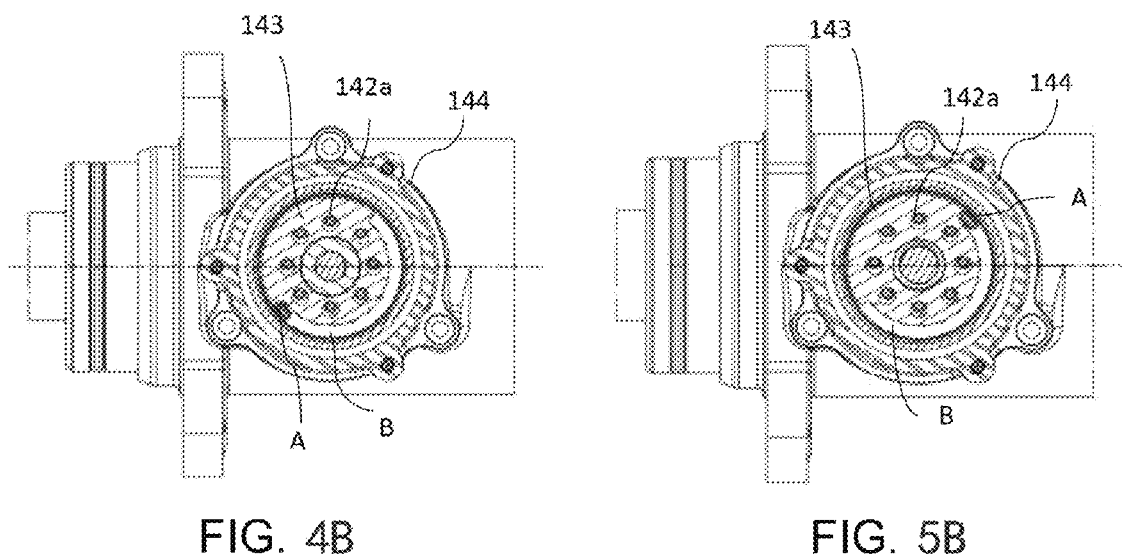
FIG. 4B shows a cross-sectional view obtained by cutting along line C-C of FIG. 2A.
FIG. 5B shows a cross-sectional view obtained by cutting along line G-G of FIG. 2B.
Figures 4C, 5C:
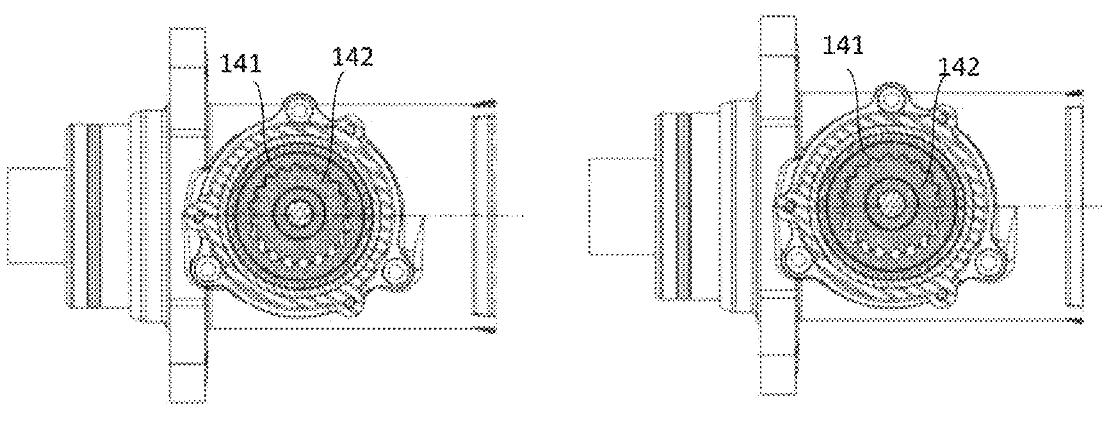
FIG. 4C shows a cross-sectional view obtained by cutting along line D-D of FIG. 2A.
FIG. 5C shows a cross-sectional view obtained by cutting along line H-H of FIG. 2B.

FIGS. 4A-4C show cross-sectional views obtained by cutting along lines B-B, C-C and D-D of FIG. 2A, respectively. The disconnect module 10 is in an engaged state at this time. FIGS. 5A-5C show cross-sectional views obtained by cutting along lines F-F, G-G and H-H of FIG. 2B, respectively. The disconnect module 10 is in a disengaged state at this time. For the convenience of comparison, two cross-sectional views at the same position are arranged side by side.

By comparing FIGS. 4A and 5A, the drive block 15 rotates by 180 degrees from the right end to the left end, and drives the sliding sleeve 12 to move from the right end point to the left end point, thereby switching from the engaged state to the disengaged state. By comparing FIGS. 4B and 5B, in this switching process, the protrusion A of the output shaft 141 slides from one end of the recess B to the other end in the recess B accordingly. The recess 15 is arc-shaped and has an arc angle of 180 degrees here. The rotation angle of the drive block 15 and the arc angle of the recess 15 may be designed according to a specific application, which is not limited here. It can also be seen that the diameter of the 8 support holes 143*a* of the support plate 143 is larger than that of the 8 transmission pins 142*a*, and these transmission pins 142*a* rotate eccentrically in the support holes 143*a*. FIGS. 4C and 5C show the meshing of the cycloidal gear 142 and the output shaft 141 in the engaged state and the disengaged state, respectively.

In addition, in an exemplary embodiment, the motor 13 and the speed reducer 14 in the disconnect module 10 are coupled so that when the mechanical position-limiting mechanism (here, the protrusion A) acts, the motor 13 maintains a first rotation direction to maintain one of the engaged state or the disengaged state, and when the motor needs to be switched to the other state, the motor rotates 13 reversely relative to the first rotation direction.

Due to the position-limiting action of the mechanical position-limiting mechanism and the motor 13 maintaining the original direction of rotation, the motor 13 will be blocked from rotating, and a MOS tube inside the motor will detect the increase in current. The advantage of such an arrangement is that by eliminating an expensive sensor device used in the traditional output feedback means, the change of the motor current increase is simply and conveniently used to output position feedback, further reducing costs.

Figure 6:
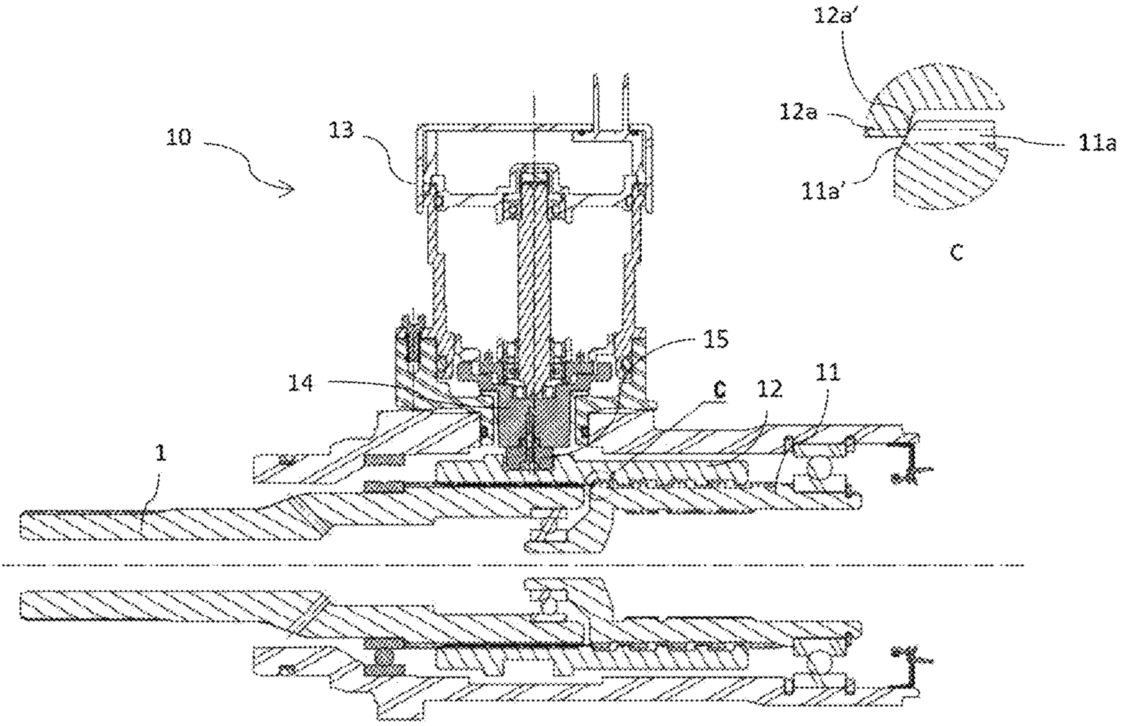
FIG. 6 shows another cross-sectional view of the disconnect module of the present disclosure.

FIG. 6 shows another cross-sectional view of the disconnect module 10 of the present disclosure. The disconnect module 10 is in a position where it just begins to enter the engaged state. The sliding sleeve 12 is connected to the connecting shaft 11 through a segmented spline, which is 4 pairs of splines axially spaced apart from each other. A first pair of splines 11*a*, 12*a* arranged on the leftmost among the 4 pairs of splines meet earlier than the other pairs of splines in an engagement process. This is achieved by adjusting the axial position of the first pair of splines 11*a*, 12*a*. Thus, the first pair of splines can serve as a guide device to guide the meshing of the other pairs of splines.

A detail C marked with a circle shows the first pair of splines 11*a*, 12*a*. An enlarged view of the detail C is shown in the upper right corner of FIG. 6. It can be seen that the first pair of splines 11*a*, 12*a* are provided with end surface chamfers 11*a*', 12*a*', respectively, and their respective end chamfers can abut against each other when meeting.

By setting the axial position of the first pair of splines 11*a*, 12*a* and providing the end chamfers 11*a*', 12*a*', the first pair of splines meet first and can then serve as the guide device to guide the meshing of the other pairs of splines, so that the meshing success rate is higher. Due to the chamfer design, internal splines and external splines of the first pair of splines 11*a*, 12*a* are in line contact at the moment of contact, rather than surface contact, so that the friction force is low and the noise is less.

In another exemplary embodiment, the first pair of splines 11*a*, 12*a* may also be arranged at other positions of the segmented spline, which can also achieve the object of the present disclosure.

The power transmission system of the vehicle provided by the present disclosure includes: a drive motor (not shown) having a drive shaft; a reduction gearbox (not shown) having at least one transmission shaft; and the disconnect module 10 described previously, wherein the first shaft is the drive shaft or the at least one transmission shaft.

The synchronization mechanism of the vehicle provided by the present disclosure includes: a differential (not shown) having a differential output shaft; and the disconnect module 10 described previously, wherein the first shaft is the differential output shaft, and the first component is a wheel.

The vehicle provided by the present disclosure includes the power transmission system described previously and/or the synchronization mechanism described previously. The vehicle may be an electrified vehicle, such as a battery electric vehicle (BEV), a hybrid electric vehicle (HEV), a plug-in hybrid electric vehicle (PHEV) or a range-extended electrified vehicle (REEV). The vehicle may also be a hydrogen-powered vehicle. It should be understood that the vehicle of the present disclosure also has the advantages described above with respect to the disconnection unit, the power transmission system, and the synchronization mechanism.

Although exemplary embodiments are described in the foregoing description, it should be noted that a large number of variants are possible. In addition, it should be noted that the exemplary embodiments are merely examples and should not be considered as any form of limitation on the scope of protection, applicability, and device construction according to the exemplary embodiments. More precisely, the summary and the description of embodiments are to provide professionals with guidance for implementing at least one exemplary embodiment, wherein various modifications can be made in terms of the function and layout of the assembly, as long as they do not deviate from the scope of protection determined by the claims and equivalent feature combinations.

What is claimed is:

1. A disconnect module for engaging and disengaging a first shaft with and from a first component, the disconnect module comprising:

a connecting shaft arranged coaxially with the first shaft, a first end of the connecting shaft is rotatably supported on the first shaft, and a second end of the connecting shaft is fixedly connected to the first component;

a sliding sleeve separately sleeved on outer sides of the first shaft and the connecting shaft, the sliding sleeve is rotatably and fixedly connected to the first shaft and is capable of reciprocating axially by an axial distance to engage with or disengage from the connecting shaft, the first shaft rotates together with the first component in an engaged state, the first shaft is independent of the first component in a disengaged state, and the sliding sleeve is provided with a circumferential groove open to an outside;

an electric motor for outputting a torque;

a speed reducer connected to the electric motor and comprising an output shaft; and a drive block fixedly connected to the output shaft and extending into the circumferential groove of the sliding sleeve to be driven by the speed reducer to rotate, thereby driving the sliding sleeve to reciprocate axially, a mechanical position-limiting mechanism is provided on the output shaft, so that the output shaft can only rotate by a set angle corresponding to the axial distance, wherein the speed reducer comprises a corresponding mechanism that cooperates with the mechanical position-limiting mechanism, one of the mechanical position-limiting mechanism and the corresponding mechanism is a protrusion, and the other is a recess allowing the protrusion to slide therein, wherein the speed reducer is a cycloidal gear speed reducer comprising:

a housing;

a cycloidal gear as an input shaft, wherein a plurality of transmission pins are provided on an end surface of the cycloidal gear; and a support plate for supporting the plurality of transmission pins, wherein the output shaft comprises a gear ring arranged around the cycloidal gear, and wherein the mechanical position-limiting mechanism is provided on a side of the gear ring facing the support plate, and the corresponding mechanism is provided on the support plate.

2. The disconnect module according to claim 1, wherein the motor and the speed reducer are coupled so that when the mechanical position-limiting mechanism acts, the motor maintains a first rotation direction to maintain one of the engaged state or the disengaged state, and when the motor needs to be switched to the other state, the motor rotates reversely relative to the first rotation direction.

3. The disconnect module according to claim 1, wherein the sliding sleeve is connected to the connecting shaft through a segmented spline, and the segmented spline is a plurality of pairs of splines axially spaced apart from each other, and the plurality of pairs of splines comprise a first pair of splines that meet earlier than other pairs of splines in an engagement process.

4. The disconnect module according to claim 3, wherein the first pair of splines are provided with end face chamfers that can abut against each other when meeting, respectively.

5. The disconnect module according to claim 1, wherein the cycloidal gear speed reducer has a speed reducing ratio set to 10-30.

6. A power transmission system for a vehicle, the power transmission system comprising:

a drive motor including a drive shaft;

a reduction including at least one transmission shaft; and the disconnect module according to claim 1, wherein the first shaft is the drive shaft or the at least one transmission shaft.

7. A vehicle, comprising the power transmission system according to claim 6.

8. A synchronization mechanism for a vehicle, the synchronization mechanism comprising:

a differential including a differential output shaft; and the disconnect module according to claim 1, wherein the first shaft is the differential output shaft and the first component is a wheel.

9. A vehicle, comprising the synchronization mechanism according to claim 8.

10. The disconnect module according to claim 1, wherein the sliding sleeve is connected to the connecting shaft through a segmented spline, and the segmented spline is a plurality of pairs of splines axially spaced apart from each other, and the plurality of pairs of splines comprise a first pair of splines that meet earlier than other pairs of splines in an engagement process.

11. A disconnect module for engaging and disengaging a first shaft with and from a first component, the disconnect module comprising:

a connecting shaft arranged coaxially with the first shaft, a first end of the connecting shaft is rotatably supported on the first shaft, and a second end of the connecting shaft is fixedly connected to the first component;

a sliding sleeve separately sleeved on outer sides of the first shaft and the connecting shaft, the sliding sleeve is rotatably and fixedly connected to the first shaft and is capable of reciprocating axially by an axial distance to engage with or disengage from the connecting shaft, the first shaft rotates together with the first component in an engaged state, the first shaft is independent of the first component in a disengaged state, and the sliding sleeve is provided with a circumferential groove open to an outside;

an electric motor for outputting a torque;

a speed reducer connected to the electric motor and comprising an output shaft; and a drive block fixedly connected to the output shaft and extending into the circumferential groove of the sliding sleeve to be driven by the speed reducer to rotate, thereby driving the sliding sleeve to reciprocate axially, a mechanical position-limiting mechanism is provided on the output shaft, so that the output shaft can only rotate by a set angle corresponding to the axial distance, wherein the speed reducer comprises a corresponding mechanism that cooperates with the mechanical position-limiting mechanism, one of the mechanical position-limiting mechanism and the corresponding mechanism is a protrusion, and the other is a recess allowing the protrusion to slide therein, wherein the speed reducer is a cycloidal gear speed reducer comprising:

a housing;

a cycloidal gear as an input shaft, wherein a plurality of transmission pins are provided on an end surface of the cycloidal gear; and a support plate for supporting the plurality of transmission pins, wherein the output shaft comprises a gear ring arranged around the cycloidal gear, and wherein the mechanical position-limiting mechanism is provided on a side of the gear ring facing the housing, and the corresponding mechanism is provided on the housing of the speed reducer.

12. The disconnect module according to claim 11, wherein the motor and the speed reducer are coupled so that when the mechanical position-limiting mechanism acts, the motor maintains a first rotation direction to maintain one of the engaged state or the disengaged state, and when the motor needs to be switched to the other state, the motor rotates reversely relative to the first rotation direction.

* * * * *